United States Patent
Morello

(10) Patent No.: US 11,137,029 B2
(45) Date of Patent: Oct. 5, 2021

(54) FLANGED INNER RING FOR WHEEL HUB BEARINGS

(71) Applicant: Aktiebolaget SKF, Gothenburg (SE)

(72) Inventor: Fausto Morello, Sommariva del Bosco (IT)

(73) Assignee: AKTIEBOLAGET SKF

( * ) Notice: Subject to any disclaimer, the term of this patent is extended or adjusted under 35 U.S.C. 154(b) by 0 days.

(21) Appl. No.: 16/983,105

(22) Filed: Aug. 3, 2020

(65) Prior Publication Data
US 2021/0033148 A1    Feb. 4, 2021

(30) Foreign Application Priority Data
Aug. 1, 2019    (IT) .................. 102019000013584

(51) Int. Cl.
*F16C 33/58*    (2006.01)

(52) U.S. Cl.
CPC ........ *F16C 33/583* (2013.01); *F16C 2326/02* (2013.01)

(58) Field of Classification Search
CPC .... F16C 19/184; F16C 19/185; F16C 19/186; F16C 19/187; F16C 2326/02; F16C 33/583; F16C 33/586; B60B 27/0005; B60B 27/0094
See application file for complete search history.

(56) References Cited

U.S. PATENT DOCUMENTS

| | | | |
|---|---|---|---|
| 2005/0018939 A1* | 1/2005 | Niwa | F16C 33/586 384/544 |
| 2006/0269181 A1* | 11/2006 | Hattori | F16C 33/583 384/544 |
| 2009/0154857 A1* | 6/2009 | Komori | B60B 27/0084 384/512 |
| 2010/0215304 A1* | 8/2010 | Torii | B60B 27/0084 384/544 |
| 2011/0254353 A1 | 10/2011 | Ciulla | |
| 2018/0135702 A1* | 5/2018 | Nakatsuji | F16C 35/06 |

FOREIGN PATENT DOCUMENTS

| | | | |
|---|---|---|---|
| DE | 112016003207 | 4/2018 | |
| DE | 102017116514 | 1/2019 | |
| FR | 3025455 | 3/2016 | |
| JP | 2005067430 | 3/2005 | |
| JP | 2008055984 A * | 3/2008 | |
| JP | 2009286238 | 12/2009 | |
| JP | 2018071644 A * | 5/2018 | ............. F16C 35/06 |

OTHER PUBLICATIONS

International Search Report for corresponding Italian Patent Application No. 102019000013584 dated Jun. 3, 2020.

* cited by examiner

*Primary Examiner* — Phillip A Johnson
(74) *Attorney, Agent, or Firm* — Reed Smith LLP

(57) ABSTRACT

A flanged inner ring for wheel hub bearings is disclosed, wherein a tubular supporting body for the bearing is coaxial with an axis (X), and is provided with a flange, transverse to the axis (X), is provided with a plurality of threaded through holes distributed around the axis (X), and is axially delimited by an outer annular mounting surface and by an inner surface axially facing an outer ring of the bearing.

2 Claims, 1 Drawing Sheet

FLANGED INNER RING FOR WHEEL HUB BEARINGS

CROSS REFERENCE TO RELATED APPLICATION

This application is based on and claims priority to Italian Application No. 102019000013584, filed Aug. 1, 2019, under 35 U.S.C. § 119, the entire contents of which are incorporated herein by reference.

BACKGROUND

Technical Field

The inventive concepts disclosed herein generally relate to a flanged inner ring for wheel hub bearings.

BRIEF DESCRIPTION OF THE DRAWINGS

The inventive concepts will now be described with reference to the attached drawings, which show some non-limiting examples of its embodiment, and wherein like designations denote like elements, in which.

DETAILED DESCRIPTION

Flanged inner rings for wheel hub bearings of a known type comprise a tubular supporting body for a wheel hub bearing, particularly for its inner ring, which are coaxial with an axis of rotation of the bearing, and a flange which is transverse to the axis of rotation, is provided with a plurality of threaded through holes distributed uniformly around the axis, and generally includes an outer annular mounting surface on which are mounted a brake disc and a rim fixed by means of threaded screws inserted into the through holes, and an inner annular surface axially facing an outer ring of the rolling bearing.

The flange generally includes a uniform basic axial thickness defined by the axial distance between the two annular surfaces and calculated to withstand the mechanical stresses typical of wheel hub bearings, and further comprises, for each threaded through hole, a radial arm, which is positioned on the inner surface of the flange in a position facing the outer ring, and extends radially outward from a mounting shoulder of the wheel hub bearing. Each radial arm acts as an element for stiffening the flange at least at the positions of the threaded through holes, and defines, with an adjacent radial arm, a respective reinforcing box having an axial thickness equal to the aforesaid basic axial thickness of the flange.

In some particular applications, since the weight of the wheel hub bearings may modify the response of the suspension system of the vehicle, making it less ready to follow the irregularities of the road surface, lightened flanged inner rings have been adopted, these rings being entirely or almost entirely lacking in the reinforcing boxes between two adjacent radial arms. However, the overall lightening of the flanged inner rings has been frustrated to some extent by the increase in the axial thickness of the radial arms that is necessary to ensure that the wheel hub bearing can still continue to withstand the mechanical stresses typical of wheel hub bearings.

The object of the present inventive concepts is to provide a flanged inner ring for wheel hub bearings that, while having a structure of very low weight, is still capable of withstanding the mechanical stresses typical of wheel hub bearings.

According to the present inventive concepts, a flanged inner ring for wheel hub bearings is described, having the characteristics stated in the attached claims.

Further preferred and/or particularly advantageous embodiments of the inventive concepts are described according to the characteristics stated in the attached claims.

Figure 1:
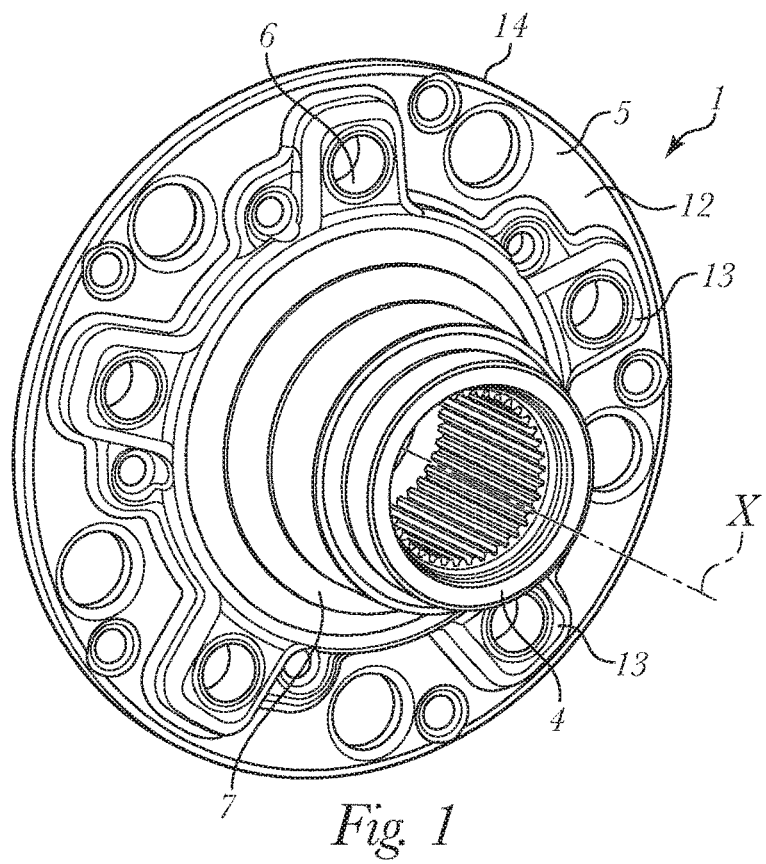
FIG. 1 is a perspective view, with parts removed for purposes of clarity, of a flanged inner ring for wheel hub bearings according to the inventive concepts disclosed herein.
Figure 2:
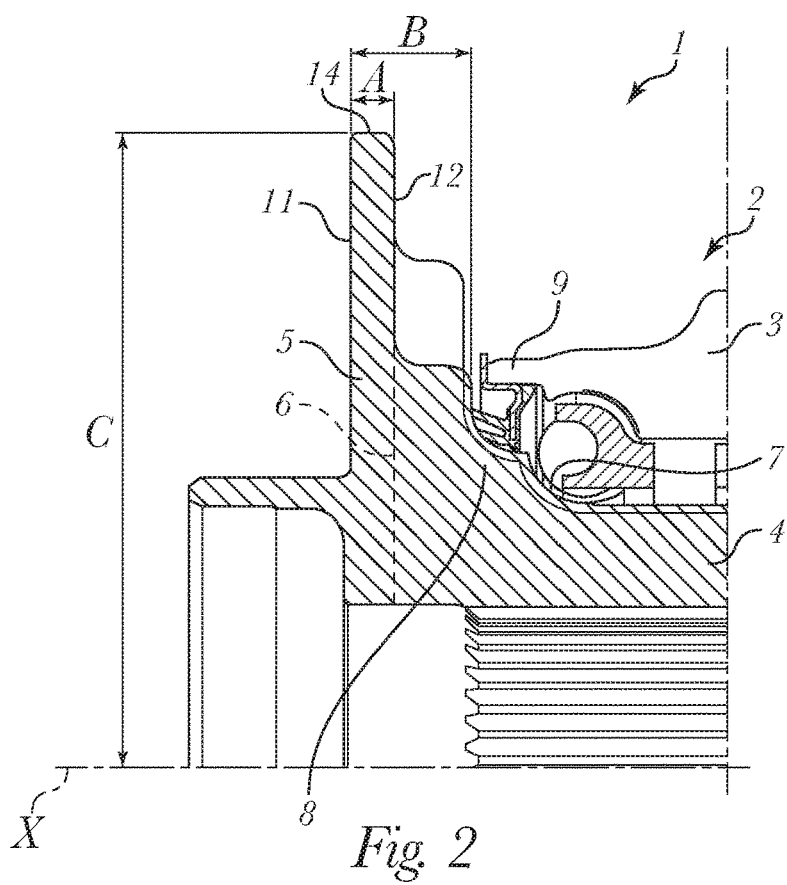
FIG. 2 is a cross section, with parts removed for purposes of clarity, of the flanged ring for wheel hub bearings of FIG. 1.

With reference to FIGS. 1 and 2, the number 1 indicates the whole of a flanged inner ring for a wheel hub bearing, illustrated only partially in the attached figures and indicated as a whole by 2.

Throughout the present description and the claims, one skilled in the art may appreciate that terms and expressions indicating positions and orientations such as "radial" and "axial" are to be interpreted as relating to a central axis X of the inner ring 1 as shown in FIG. 1. On the other hand, one skilled in the art may appreciate that expressions such as "axially outer" and "axially inner" relate to the assembled condition, and may relate to a wheel side and to a side opposite the wheel side, respectively.

The inner ring 1 illustrated in FIG. 1 comprises a tubular body 4 coaxial with the axis X, and a flange 5, which is transverse to the axis X, and is provided with a plurality of threaded through holes 6 uniformly distributed around the axis X. The tubular body 4 is also an integral part of the wheel hub bearing 2, of which it defines an inner ring, and has a race 7 of the wheel hub bearing. The race 7 being formed directly on the tubular body 4 at a shoulder 8 of the body, on which a seal 9 is mounted, as shown in FIG. 2.

In an alternative embodiment of the flanged inner ring 1, which is not shown but is easily deducible from the above description, the wheel hub bearing 2, instead of having its own race 7 integrated with the tubular body 4, comprises two inner rings provided with respective races, and, wherein, one of the two inner rings is mounted on the tubular body 4 axially behind the shoulder 8.

The flange 5 has an axially outer mounting annular surface 11, as illustrated in FIG. 2, on which are mounted a brake disc and a rim (not shown) fixed by means of threaded screws (not shown) inserted into the threaded through holes 6, and an inner surface 12, which axially faces an outer ring 3 of the bearing 2, and forms, through the inner ring 1, an axial section S transverse to the axis X, from which the shoulder 8 extends axially towards the outer ring 3. As shown in FIG. 2, the flange 5 is radially delimited by an outer cylindrical surface 14 having a diameter C, and comprises, for each through hole 6, a radial arm 13, which extends radially outwards from the shoulder 8, but without reaching the cylindrical surface 14, and extends axially towards the outer ring 3 from the surface 12.

The inner ring 1 is formed by forging and, from the outset, has radial arms 13, which form a single body with the shoulder 8 and with the flange 5, which, between the two surfaces 11 and 12 and between each pair of radial arms 13, has a basic axial thickness A, which is uniform and smaller than an axial thickness B of the shoulder 8, as illustrated in FIG. 2.

According to an embodiment of the present inventive concepts, the uniform basic axial thickness A of the flange 5 has a value of 3 mm, that is to say a value well below those currently used in flanges of flanged inner rings of known types. This, in-turn, enables the flanged inner ring 1 both to withstand the mechanical stresses typical of wheel hub bearings, and provides a structure of very low weight to improve the response of the suspension system of the vehicle, making it more ready to follow the irregularities of the road surface. In order to achieve the desired reduction of the weight of the flanged inner ring 1 for an equivalent mechanical strength, one skilled in the art may appreciate that this result may be obtained not only if the uniform basic axial thickness A of the flange 5 has a value of 3 mm, but also if the ratio of the dimensions of the flange 5 to those of the shoulder 8 is within a correctly specified range. That is, if the value of the ratio A/B between the uniform basic axial thickness A of the flange 5 and the axial thickness B of the shoulder 8 has values in the range from a minimum of 0.15 to a maximum of 0.4, and, similarly, also if the value of the ratio A/C between the uniform basic axial thickness A of the flange 5 and the diameter C of the flange 5 has values in the range from a minimum of 0.018 to a maximum of 0.03.

In particular, if the ratios A/B and A/C are above the respective minimum values, the forging of the flanged inner ring 1 presents no problems, since the forging material flows without any impediment, enabling a forging to be formed without any cracking. Additionally, if the ratios A/B and A/C are above the respective minimum values, the flanged inner ring 1 effectively withstands the tilting moments created by what are known as "cornering" manoeuvres of the vehicle, and also withstands the axial and radial loads due to the weight of the vehicle itself.

One skilled in the art may appreciate that if the ratios A/B and A/C are above their respective minimum values, then the relation between the dimensions of the flange 5 and the dimensions of the shoulder 8 is such that, although the flange 5 is rather slim, at least in the space between each pair of radial arms 13, the shoulder 8 still contributes to the overall rigidity of the assembly because of the dimensions that are adapted in an innovative way to this slimness. Thus, preventing and inhibiting deformation of the flange 5.

On the other hand, if the ratios A/B and A/C are below their respective maximum values, there is no wastage of raw material for forging, resulting in a reduction of the corresponding costs of both procurement of raw materials and production, and there is also optimal balancing of the rotating masses of the flanged inner ring 1. One skilled in the art may appreciate that if the ratios A/B and A/C are below their respective minimum values, the relation between the dimensions of the flange 5 and the dimensions of the shoulder 8 is such that, even if the shoulder 8 is itself rather slim, the flange 5 does not have radial dimensions such that it freely overhangs radially beyond the shoulder 8 and is therefore too flexible.

One skilled in the art may appreciate that some of the advantages of the solution described above are evident, for example, reduction in terms of weight of the flanged inner ring 1 not only allows the bearing manufacturer to make savings in terms of raw material and production costs, but also allows the vehicle manufacturer to make savings in terms of carbon dioxide ($CO_2$), which are entirely favourable to the environment, and, therefore ensure compliance with increasingly strict environmental protection standards.

Additionally, in spite of the weight reduction achieved in the flanged inner ring 1, which, it will be recalled, is made with a thickness A of the flange 5 considerably smaller than the conventional thickness, combined with dimensional ratios between the thickness A and the thickness B, and the diameter C, the flanged inner ring 1, simply because of this dimensional geometry, achieves the desired performance, both in terms of rigidity and resistance to mechanical stresses, and in terms of durability, while also making it possible to provide a more competitive product by comparison with those currently on the market.

In addition to the embodiments of the inventive concepts as described above, it is to be understood that numerous other variables may exist. It is also to be understood that said embodiments are provided solely by way of example and do not limit the object of the inventive concepts, or its applications, or its possible configurations. On the contrary, although the description given above enables those skilled in the art to implement the present invention according to at least one example of its configurations, it is to be understood that numerous variations of the components described may be envisaged without thereby departing from the object of the inventive concepts as defined in the appended claims, interpreted literally and/or according to their legal equivalents.

The invention claimed is:

1. A flanged inner ring for a wheel hub bearing, comprising:
   a tubular body for the wheel hub bearing, coaxial with an axis (X),
   a flange transverse to the axis (X) comprising a plurality of threaded through holes distributed around the axis (X), wherein the flange comprises a basic axial thickness (A) which is axially delimited by an outer annular mounting surface and by an inner surface axially facing an outer ring of the wheel hub bearing;
   a respective radial arm for each threaded through hole, positioned on the inner surface of the flange in a position facing the outer ring; and
   a shoulder from which the radial arms extend radially outward, the shoulder comprises a respective axial thickness (B) greater than the basic axial thickness (A) of the flange;
   wherein the flange, the shoulder and the radial arms are formed in one piece, and
   the basic thickness (A) of the flange, at least between each pair of adjacent radial arms, is thinner than the shoulder and is related to the axial thickness (B) of the shoulder and to the diameter (C) of the flange, wherein the value of a first ratio (AB) between the basic axial thickness (A) of the flange and the axial thickness (B) of the shoulder takes values in the range from a minimum of 0.15 to a maximum of 0.4, and the value of a second ratio (A/C) between the basic axial thickness (A) of the flange and the diameter (C) of the flange takes values in the range from a minimum of 0.018 to a maximum of 0.03.

2. The flanged inner ring of claim 1, wherein the basic axial thickness (A) is equal to 3 mm.

\* \* \* \* \*